No. 662,277.  Patented Nov. 20, 1900.
H. LEITNER.
SEPARATOR FOR SECONDARY BATTERY PLATES.
(Application filed May 28, 1900.)

(No Model.)

Witnesses.
Robt. D. Johnston Jr.
C. D. Kesler.

Inventor
Henry Leitner
By James L. Norris
Atty.

UNITED STATES PATENT OFFICE.

HENRY LEITNER, OF LONDON, ENGLAND, ASSIGNOR TO THE ELECTRICAL UNDERTAKINGS, LIMITED, OF SAME PLACE.

SEPARATOR FOR SECONDARY-BATTERY PLATES.

SPECIFICATION forming part of Letters Patent No. 662,277, dated November 20, 1900.

Application filed May 28, 1900. Serial No. 18,283. (No model.)

*To all whom it may concern:*

Be it known that I, HENRY LEITNER, a citizen of England, residing at 207 Piccadilly, London, England, have invented a certain new and useful Separator for Plates of Secondary Batteries, (for which I have applied for a patent in Great Britain, dated October 28, 1899, No. 21,562,) of which the following is a specification.

My invention relates to the construction of separators of the plates of secondary voltaic batteries in such a manner that while they afford good support for the plates and their active material they allow free circulation of the electrolyte, as I shall describe, referring to the accompanying drawings.

Figure 1:
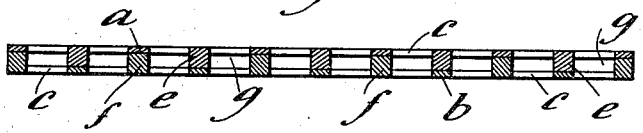
Figure 2:
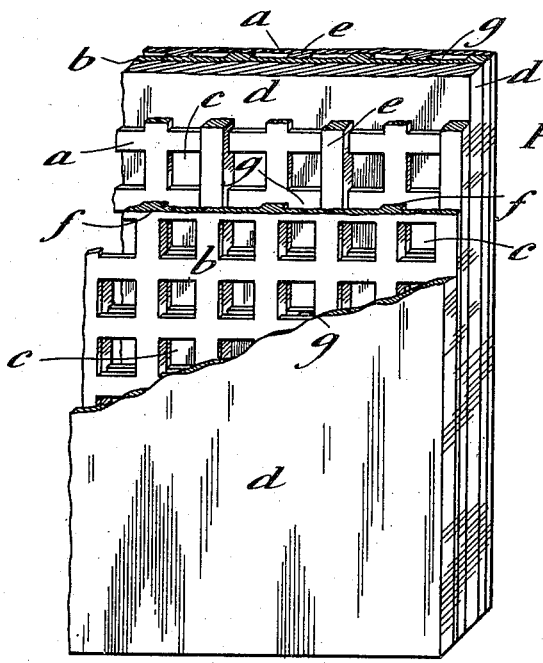

Figure 1 is a sectional plan of a separator-plate according to my invention, and Fig. 2 is a perspective view showing parts of the secondary-battery plates kept apart by such separators.

Each separator-plate consists of two sheets $a$ and $b$ of non-conducting material, such as ebonite, in the form of a grating having holes $c$ arranged in rows. The outer sides of the sheets $a$ $b$ are flat, so as to bear against and support the active material of the battery-plate $d$, and on the inner sides between the alternate vertical rows of holes are projecting ribs $e f$, respectively, made with flat faces, as shown, so that when the two sheets are placed together and cemented the vertical ribs $e$ of sheet $a$ bear against the parts of sheet $b$ between the holes where there are no ribs and similarly the vertical ribs $f$ of sheet $b$ bear against the parts of sheet $a$ where there are no ribs, the spaces between the ribs $e f$ forming channels $g$ for free passage of the electrolyte.

I claim—

A separator for plates of secondary batteries consisting of two sheets of non-conducting material with holes in them arranged in rows, each sheet being flat on one side and provided on the other with vertical ribs between the alternate rows of holes, the ribs of one sheet being cemented to the other sheet between the ribs of that sheet, substantially as and for the purpose set forth.

In testimony whereof I have hereunto set my hand in presence of two subscribing witnesses.

HENRY LEITNER.

Witnesses:
 GERALD L. SMITH,
 EDWARD GARDNER.